United States Patent
Persson et al.

(10) Patent No.: US 7,308,201 B2
(45) Date of Patent: *Dec. 11, 2007

(54) OPTICAL COMMUNICATION SYSTEM

(75) Inventors: Ulf A. Persson, Skogås (SE); Magnus G. Öberg, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 11/461,717

(22) Filed: Aug. 1, 2006

(65) Prior Publication Data

US 2007/0003284 A1  Jan. 4, 2007

Related U.S. Application Data

(62) Division of application No. 09/935,459, filed on Aug. 23, 2001, now Pat. No. 7,110,673.

(60) Provisional application No. 60/232,271, filed on Sep. 13, 2000.

(30) Foreign Application Priority Data

Aug. 30, 2000  (EP) .................. 00118760

(51) Int. Cl.
*H04B 10/08* (2006.01)
*H04J 14/02* (2006.01)

(52) U.S. Cl. .............. 398/83; 398/85; 398/30; 398/31

(58) Field of Classification Search ............ 398/30–33, 398/82, 83, 85
See application file for complete search history.

(56) References Cited

U.S. PATENT DOCUMENTS

| 6,002,503 A * | 12/1999 | Mizrahi ................ 398/85 |
| 6,141,125 A | 10/2000 | Blair et al. |
| 6,515,777 B1 * | 2/2003 | Arnold et al. ............ 398/97 |
| 6,545,783 B1 | 4/2003 | Wu et al. |
| 6,687,463 B1 * | 2/2004 | Hutchison et al. ......... 398/83 |

FOREIGN PATENT DOCUMENTS

| EP | 1 069 720 A2 | 1/2001 |
| WO | WO 98/52306 | 11/1998 |
| WO | WO 99/40700 | 8/1999 |
| WO | WO 00/48347 | 8/2000 |
| WO | WO 00/76105 A1 | 12/2000 |

OTHER PUBLICATIONS

Gerstel, O et al "Upgrading SONET Rings with WDM instead of TDM: An Economic Analysis", Optical Fiber Communication Conference and The International Conference on Integrated Optics and Optical Fiber Communications, Feb. 21, 1999 (pp. 75-77).

\* cited by examiner

*Primary Examiner*—Dalzid Singh

(57) ABSTRACT

A node is provided in an optical communications network that utilizes a first set of add/drop filter elements for extracting and combining optical signals that are carried on wavelength division multiplexed channels in a first wavelength band. Additionally, an extraction element and a combining element for dropping and adding a service channel associated with the wavelength division multiplexed channels. The extraction element is arranged downstream of the add/drop filter elements. The extraction and combining elements are additionally adapted to drop and add, respectively, at least one further wavelength band carrying at least one optical traffic data channel.

17 Claims, 2 Drawing Sheets

OPTICAL COMMUNICATION SYSTEM

CROSS-REFERENCE TO RELATED APPLICATIONS

This application is a divisional of U.S. application Ser. No. 09/935,459, filed Aug. 23, 2001, now U.S. Pat. No. 7,110,673, which claims the benefit of U.S. Provisional Application No. 60/232,271, filed Sep. 13, 2000, the disclosure of which is incorporated herein by reference.

BACKGROUND

Optical communication systems employing wavelength division mulitiplexing (WDM) use a single fibre to carry multiple traffic channels within a predetermined wavelength band. WDM systems are being deployed increasingly to optimize the transmission capacity of existing networks. Conventional WDM systems typically operate in a wavelength window centered around 1550 nm. They also typically use at least one service channel for carrying system information, for example network control information and control signals. This channel is often carried on the same optical fibre as the traffic information, but outside the traffic carrying bandwidth. For example, a service channel commonly used with the 1550 waveband is carried on the 10 nm wavelength.

Many optical systems in use today operate in the 1300 nm window. An example is the SONET/SDH. While WDM systems have obvious advantages, their introduction involves considerable investment as new equipment must be installed and maintained even in existing networks. The process is therefore a gradual one. When introducing WDM traffic to existing networks, operators are often obliged to maintain the previous service, at least for a time. The simultaneous operation of a WDM system operating in the 1550 nm window with other services centered round the 1300 nm waveband on the same network, and within the same nodes, requires certain measures to prevent interference between the two services. This includes the installation of filter components, which may comprise simple fused couplers or thin film filters for separating the 1300 nm waveband from the 1550 nm waveband. In non-amplified WDM systems, filter components are necessary for separating out the service channel at each node. However, each filter component causes a basic power loss to channels passively relayed through the filter. The additional 1550 nm/1300 nm couplers along any single link will naturally increase the total link loss, in some cases to a level that exceeds the allowable link loss, such that the WDM system cannot be utilized over the whole network.

There is consequently a need for an arrangement that can allow WDM systems operating in a first wavelength band to be used on existing optical networks at the same time as optical systems operating in a second different wavelength band.

SUMMARY

The invention meets the above need by the provision of a node in an optical communications network that has a first set of add/drop filter elements for extracting and combining optical signals carried on wavelength division multiplexed channels in a first wavelength band and an extraction element and combining element for dropping and adding, respectively, a service channel associated with the wavelength division multiplexed channels. The extraction element is arranged upstream of the add/drop filter elements relative to the direction of traffic flow, and the combining element is arranged downstream of the add/drop filter elements. The extraction and combining elements are additionally adapted to drop and add, respectively, at least one further wavelength band carrying at least one optical traffic data channel.

By combining the adding and dropping of traffic channels that are separate from the WDM wavelengths with that of the service channel, the WDM traffic can be extracted, processed and combined with the transmission path in the normal manner without the need for additional filter elements to prevent interference and without the additional imposed losses associated therewith.

The traffic channels carried on the second wavelength band are preferably not wavelength division multiplexed channels. However, this may not be the case, and the separation of the two bands prior to the dropping and adding of individual channels means that a second wavelength band carrying WDM traffic will likewise be protected from the additional loss of the w)M add/drop filter elements.

The extraction element is connected to a splitting arrangement for separating the service channel wavelength from the second wavelength band. The separated wavelengths can then be converted to electrical signals and processed separately. The second wavelength band and service channel wavelength are furthermore combined using a coupling arrangement which then relays the combined signals to the combining element.

Advantageously, a bypass path can be provided for the second wavelength band between the splitting arrangement and the coupling arrangement. The second wavelength band is thus merely removed from the transmission path to allow the WDM channels to be extracted from the transmission path, processed and added to the transmission path.

The second wavelength band is preferably arranged on the same side of the wavelength spectrum as the service channel wavelength relative to the first wavelength band, as this greatly simplifies the construction of the extraction and combining elements.

Preferably, the first wavelength band is centered around 1550 nm. while the second wavelength band is centered around 1300 nm. The service channel is preferably carried at 1510 nm.

The invention also resides in an optical network including nodes as described above.

BRIEF DESCRIPTION OF THE SEVERAL VIEWS OF THE DRAWINGS

Further objects and advantages of the present invention will become apparent from the following description of the preferred embodiments that are given by way of example with reference to the accompanying drawings. In the figures.

DETAILED DESCRIPTION

Figure 1:
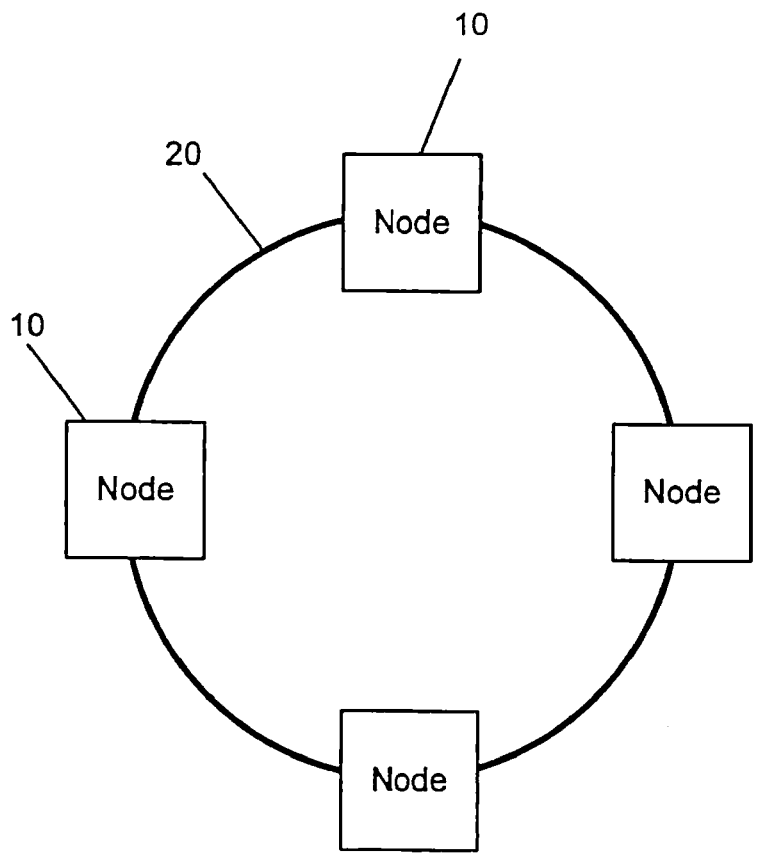
FIG. 1 schematically illustrates an optical network.

FIG. 1 shows an optical communications network comprising a number of nodes 10 connected by a bidirectional transmission path 20 constituted by optical fibres. In the simplified network shown in FIG. 1, the nodes 10 are connected to form a ring configuration, however it will be understood that the present invention may be employed in other network architectures.

Two communications systems are carried by the illustrated network. The first is a system carrying user traffic in the wavelength band centered on 1300 nm, for example the SONET/SDH. The other system is a wavelength division multiplexed (WDM) system operating in the 1550 nm window. An optical service channel OSC carried at 1510 nm provides system information, such as network monitoring and control information to and from each node 10 for the WDM system. Each node 10 comprises add/drop filter components for combining or extracting channels of specified wavelengths to and from the transmission path. Each wavelength that is not dropped by a filter component is passively relayed by the component, either by transmission or reflection, with a finite loss. The optical service channel OSC is also dropped at each node 10 that serves as a WDM node, i.e. a node that drops or adds WDM traffic.

Figure 2:
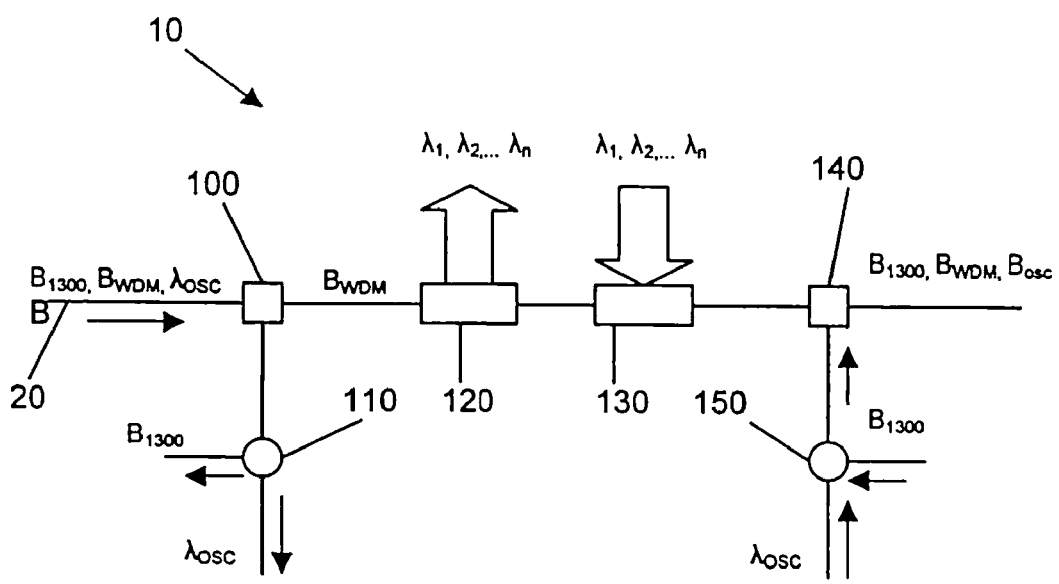
FIG. 2 schematically illustrates part of a node in an optical communications network according to a first embodiment of the present invention and FIG. 3 schematically illustrates part of a node according to a second embodiment of the present invention.

Turning to FIG. 2, there is shown a schematic representation of part of a node 10 according to a first embodiment of the present invention. The figure specifically shows the arrangement of add/drop elements for a node wherein traffic channels carried in the 1300 nm wavelength window denoted by $B_{1300}$ and wavelength division multiplexed traffic channels carried in the 1550 nm window denoted by $B_{WDM}$ are added to the network and dropped from the network. Since the node 10 serves WDM traffic, the optical service channel carried at wavelength 1510 nm and denoted by $\lambda_{OSC}$ is likewise dropped and added at the node 10.

The data carried by wavelengths $B_{1300}$, $B_{WDM}$ and $\lambda_{OSC}$ arrives at the node 10 via the optical fibre transmission path 20. Only a single unidirectional fibre is shown in FIG. 2. It will be understood, however, that a second fibre may be provided for carrying information in the reverse direction. A first drop filter 100 is connected to the input fibre 20 for extracting the 1330 nm wavelength window and the OSC channel. In the present embodiment, the OSC channel is carried at 1510 nm. The OSC channel and the 1300 nm traffic are thus carried on the same side of the wavelength spectrum relative to the WDM traffic and can be dropped from the transmission path 20 using filter having a simple band pass or high-pass frequency transmittance characteristic. For a simple high-pass frequency characteristic, the cut-off frequency would be chosen to correspond to a suitable wavelength below, i.e. shorter than, the wavelength of the 1550 nm window. Naturally, if the 1300 nm or non-WDM traffic and the OSC channel were carried on wavelengths located on opposite sides of the 1550 nm wavelength window, the drop filter 100 would be designed to have a high transmittance at the non-WDM traffic wavelengths and the OSC wavelength and a low transmittance in the 1550 nm window. The filter 100 is preferably an interference filter, such as a thin film filter, but other filter designs are also possible, for instance a fibre grating filter such as a Bragg grating filter.

After extraction from the transmission path 20, the non-WDM channels carried on the wavelength band $B_{1300}$ and the OSC channel at $\lambda_{OSC}$ are fed to a further filter 110 which separates the wavelength band $B_{1300}$ from the OSC channel wavelength $\lambda_{OSC}$. Filter 110 can be the same type as filter 100, i.e. preferably an interference filter. The non-WDM traffic is then processed in the usual manner by non-shown circuitry in the node 10. Information on the OSC channel is likewise received and processed by specific, non-shown circuitry as is generally known in the art.

The WDM channel wavelengths are passively relayed at filter 100 and undergo a finite power loss thereby. Depending on the filter technology utilized, the WDM channel wavelengths will be either reflected or transmitted by the filter 100. Additional add/drop filters 120, 130 are arranged on the transmission path for the WDM wavelengths, which for the sake of example will be denoted as $\lambda_1, \lambda_1, \ldots \lambda_n$. These may take the form of multiple add/drop filters, where each filter is designed to drop and/or add a single channel wavelength $\lambda_1, \lambda_2, \ldots \lambda_n$, from among all the WDM channels. Alternatively, the filters 120, 130 may take the form of a demultiplexer and multiplexer, respectively, for dropping/adding multiple channels $\lambda_1, \lambda_2, \ldots \lambda_n$ together and subsequently separating these into the individual wavelengths. It will be appreciated that any combination of wavelengths may be dropped and added by the elements 120 and 130 depending on the connections required in the network. The possible configurations are generally known in the art and will not be described further here.

Downstream of the final add filter 130 non-WDM traffic and the OSC channel are again added to the transmission path 20 using a coupler 140. The wavelengths of the non-WDM traffic $B_{1300}$ and the OSC channel $\lambda_{OSC}$ are combined upstream of this coupler 140 in a separate coupler 150. The couplers 140, 150 are preferably of the same type and design as filters 100 and 10, respectively, but may be of any suitable structure.

By dropping and adding both the non-WDM traffic and the OSC channel with the same add/drop filter the loss suffered by the WDM traffic channels is limited to that imposed by a single filter. This is of great advantage for non-amplified WDM systems, since each additional add/drop filter on the transmission path imposes a finite power loss on the channels. Each loss in power is equivalent to a specific length of optical fibre, so ultimately the number of add/drop elements on a transmission path limit the useful size of a network for WDM traffic. In conventional WDM systems the OSC channel is generally dropped for processing before the WDM traffic channels and recombined with the transmission path after any WDM channels have been added. Combining the extraction and addition of the non-WDM traffic channels with that of the OSC channel allows the network to be utilized simultaneously for different optical communication systems without imposing additional power loss on WDM channels.

Figure 3:
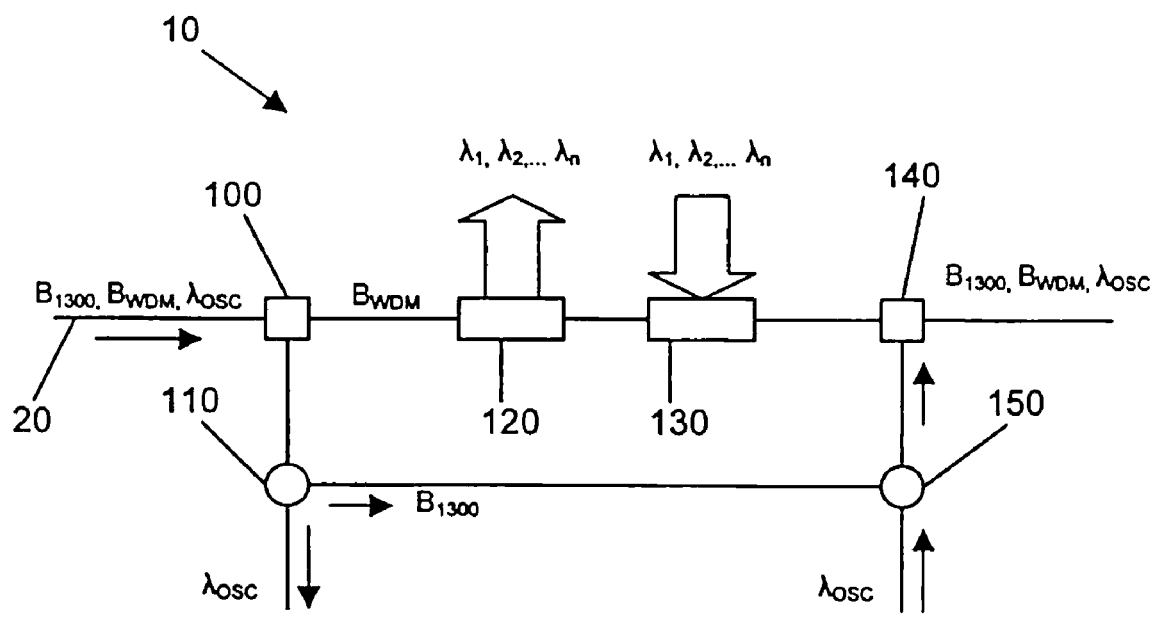

In a further embodiment of the present invention the non-WDM traffic is not processed at the node 10 but merely transmitted through the node. This is shown schematically in FIG. 3. The arrangement in FIG. 3 is almost identical to that of FIG. 2 with the exception that the non-WDM traffic at the 1300 wavelength band $B_{1300}$ is not extracted for processing, but is instead transmitted directly to the coupler 150 for combining with the new information on the OSC channel $\lambda_{OSC}$. The non-WDM traffic is thus essentially bypassed. In addition to limiting the power loss imposed on the WDM channels, this arrangement also permits the standard WDM add/drop elements 120, 130 to be used. If the non-WDM traffic channels in the 1300 nm wavelength band were transmitted through the node with the WDM channels, the filters 120, 130 would need to be specially adapted to prevent the two wavelength bands $B_{1300}$ and $B_{WDM}$ from interfering with one another.

What is claimed:

1. A method for carrying multiple traffic data channels in a transmission path in an optical communication network, including wavelength division multiplexed (WDM) channels carried in a first wavelength band and at least one service channel wavelength associated with the WDM channels and carried on at least one further wavelength that is separate from the first wavelength band, the method comprising:

adding at least one WDM channel wavelength to the transmission path or dropping at least one of the WDM channel wavelengths from the transmission path utilizing a first set of filter elements;

dropping the at least one service channel wavelength from the transmission path utilizing an extraction element, the extraction element being arranged upstream of the first set of filter elements, adding the at least one service channel wavelength to the transmission path utilizing a combining element, the combining element being arranged downstream of the first set of filter elements, the extraction element and the combining element being adapted to drop and add a second wavelength band in addition to the at least one service channel wavelength, and passively relay the first wavelength band, the second wavelength band being separate from the first wavelength band and carrying at least one optical traffic data channel;

arranging the at least one service channel wavelength and the second wavelength band on the same side of the wavelength spectrum relative to the first wavelength band; and utilizing the extraction element and the combining element for dropping and adding, respectively, all wavelengths on the side of the spectrum containing the at least one service channel wavelength and the second wavelength band.

2. The method as claimed in claim 1, wherein the second wavelength band carries non-WDM traffic channels.

3. The method as claimed in claim 1, further comprising utilizing a splitting means for
receiving optical signals from the extraction element and
separating the service channel wavelength from the second wavelength band.

4. The method as claimed in claim 1, further comprising utilizing coupling means for
feeding optical signals to the combining means and
coupling the at least one service channel wavelength with the second wavelength band.

5. The method as claimed in claim 4, wherein the splitting means are directly connected to the coupling means for relaying signals carried on the second wavelength band from the splitting means to the coupling means.

6. The method as claimed in claim 1, wherein the first wavelength band is centered on 1550 nm and the second wavelength band is centered on 1300 nm.

7. The method as claimed in claim 6, wherein the service channel is carried at 1510 nm.

8. A node in an optical communication network, the node being connected in a transmission path for carrying multiple traffic data channels including wavelength division multiplexed (WDM) channels carried in a first wavelength band and at least one service channel wavelength associated with the WDM channels and carried on at least one further wavelength that is separate from the first wavelength band, the node comprising a first set of filter elements for adding at least one WDM channel wavelength to the transmission path or dropping at least one of the WDM channel wavelengths from the transmission path, an extraction element for dropping the at least one service channel wavelength from the transmission path, the extraction element being arranged upstream of the first set of filter elements, and a combining element for adding the at least one service channel wavelength to the transmission path, the combining element being arranged downstream of the first set of filter elements, the extraction element and the combining element being adapted to drop and add, respectively, a second wavelength band in addition to the at least one service channel wavelength, and passively relay the first wavelength band, the second wavelength band being separate from the first wavelength band and carrying at least one optical traffic data channel, wherein the at least one service channel wavelength and the second wavelength band are arranged on the same side of the wavelength spectrum relative to the first wavelength band, wherein the extraction element and the combining element drop and add, respectively, all wavelengths on the side of the spectrum containing the at least one service channel wavelength and the second wavelength band.

9. The node as claimed in claim 8, wherein the second wavelength band carries non-wavelength-division-multiplexed traffic channels.

10. The node as claimed in claim 8, further comprising splitting means arranged to receive optical signals from the extraction element and to separate the service channel wavelength from the second wavelength band.

11. The node as claimed in claim 10, wherein the splitting means is directly connected to the coupling means for relaying signals carried on the second wavelength band from the splitting means to the coupling means.

12. The node as claimed in claim 8, further comprising coupling means arranged to feed optical signals to the combining means and to couple the at least one service channel wavelength with the second wavelength band.

13. The node as claimed in claim 8, wherein the first wavelength band is centered on 1550 nm and the second wavelength band is centered on 1300 nm.

14. The node as claimed in claim 13, wherein the service channel is carried at 1510 nm.

15. An optical communications network for carrying a first wavelength band carrying wavelength division multiplexed (WDM) optical data channels, comprising:

at least one optical service channel associated with the wavelength division multiplexed WDM channels carried on at least one further wavelength;

optical nodes connected to a transmission path, each node having
a first set of add/drop elements for adding and dropping optical data channels carried in the first wavelength band and
second add/drop elements for adding and dropping channels carried on the at least one further wavelength, wherein the second drop element is arranged upstream of the first set of add/drop elements and the second add element is arranged downstream of the first set of add/drop elements, the communication network including a second wavelength band carrying optical traffic data, wherein the second add/drop elements are arranged to add/drop the second wavelength band in addition to the at least one further wavelength; and a bypass path for the second wavelength band directly connecting the second drop element to the second add element.

16. The network as claimed in claim 15, further comprising splitting means arranged to receive optical signals from the second drop element and to separate the second wavelength band from the at least one further wavelength.

17. The network as claimed in claim 15, further comprising coupling means arranged to feed optical signals to the second add element and to couple signals carried on the second wavelength band with signals carried on the at least one further wavelength.

* * * * *